United States Patent Office 3,345,906
Patented Oct. 10, 1967

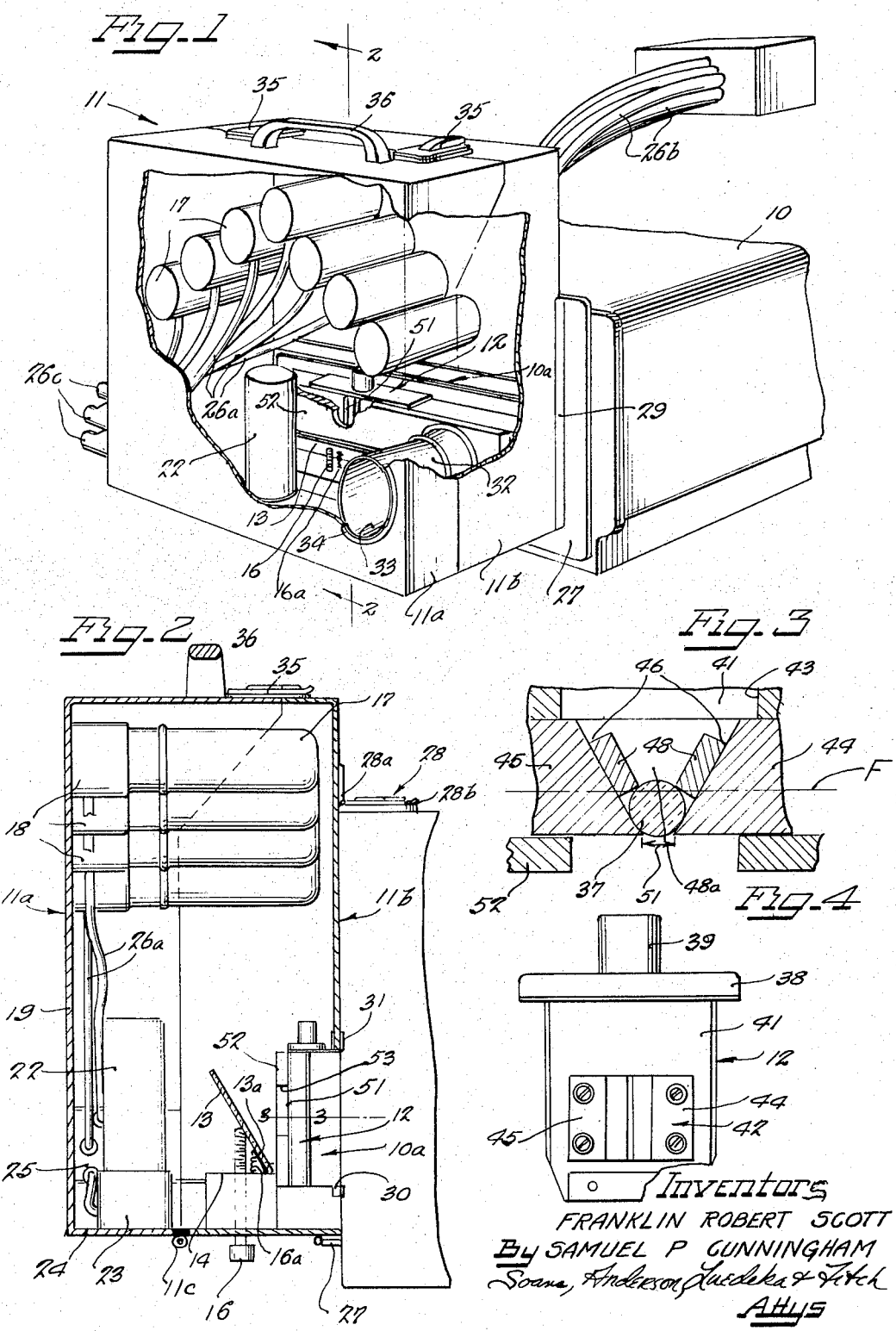

3,345,906
SPECTRAL LINE PROFILE ANALYZER
Franklin R. Scott, La Jolla, and Samuel P. Cunningham, Los Angeles, Calif., assignors to General Dynamics Corporation, New York, N.Y., a corporation of Delaware
Filed Sept. 4, 1962, Ser. No. 221,142
4 Claims. (Cl. 88—14)

This invention relates to devices useful in spectral analysis and more particularly to an optical device for detecting and recording the characteristics of narrow spectral regions derived from a transient source.

The present day quest for controlled thermonuclear power has placed great emphasis on plasma research with a corresponding realization of the need for suitable plasma diagnostic methods and devices. Included among the more feasible techniques which are employed to carry out plasma diagnostics is spectrographic analysis. This technique has been employed to provide detailed information concerning the composition and the degree of purity of the plasma, the electron temperature, the ion temperature, and the ion density.

The previously developed methods and devices that have been utilized to carry out spectrographic analysis of a plasma discharge so that the aforementioned characteristics can be detected and recorded have been somewhat limited in their usefulness. More prticularly, one of the more common diagnositic techniques being employed calls for the observation of a portion of a narrow spectral region with a single photocell. When utilizing such an arrangement, the system is pulsed so that one segment of the spectral region is observed and, during subsequent pulsations of the system, the photocell is positioned at various wave length settings across the region. Manifestly, this technique requires a plurality of successive pulsed discharges with a limited amount of information being derived from each discharge. Not only is such a technique extremely time consuming, but the variations in the plasma from discharge to discharge have imposed a substantial limitation on the accuracy and reliability of the results of such investigations.

Accordingly, it is the prime object of the present invention to provide a new and improved optical device which can be utilized to determine the profile of a narrow spectral region derived from a single pulse of a transient source so that various characteristics of the source can be readily detected and recorded.

Still another object of the invention is to provide a new and improved optical device that can be utilized to split a spectral region into a plurality of wave length bands which can be simultaneously detected and recorded so that various characteristics of a gaseous discharge can be determined.

A further object of the present invention resides in the provision of an improved optical line splitter which has the desirable characteristics of simplicity and compactness and which can be utilized to effect time dependent observations of emission line profiles from plasmas.

Other objects and advantages of the present invention will become apparent from the following detailed description when considered in conjunction with the accompanying drawing wherein:

FIGURE 1 is a perspective view of a monochromator adapted with one embodiment of an improved optical device, the housing of which is broken away to show the component parts thereof;

FIGURE 2 is an enlarged cross sectional view taken along the line 2—2 in FIGURE 1;

FIGURE 3 is an enlarged cross sectional view taken along the line 3—3 in FIGURE 2 which illustrates various features of a fixed exit slit of the optical device illustrated in FIGURES 1 and 2; and FIGURE 4 is an enlarged view of the exit slit utilized in conjunction with the optical device of FIGURE 1.

In one preferred embodiment, the optical device is designed for utilization with a monochromator that supplies an optical emission line from a pulsed discharge. The optical device includes a cylindrical lens secured to the exit slit assembly of the monochromator so that a single spectral line of finite width produced in the focal plane of the monochromator is dispersed and substantially broadened.

A plurality of photomultiplier tubes is formed in such a configuration that the dispersed emission line is directed from the cylindrical lens to the photocathodes of the photomultipliers. The photomultipliers are spaced and arranged so that each intercepts an equal wave length portion of the dispersed emission line. The output signal from each of the photomultipliers representing individual wave length portions or bands is utilized to yield information pertinent to the characteristics of the total emission line and, accordingly, the pulsed discharge.

Various monochromators might be utilized and adapted with the optical device of the present invention. However, the description of one particular embodiment hereinafter set forth will be based on the use of the optical device in conjunction with a monochromator having a fixed exit slit whose width can be varied from about 250 microns to about 3000 microns. The monochromator, which is disclosed in the drawings by way of example, includes a symmetrical Ebert optical arrangement with the entrance and exit slits thereof mounted in side by side relation in one end wall of the monochromator.

Referring to FIGURE 1, a monochromator 10, which may be a commercially available type, is shown as being adapted with the optical device of the present invention. The optical device includes a plurality of components, all of which are supported by and confined within a rectangular, light-tight housing or case 11. As hereinafter described in detail, the light-tight case 11 includes a base portion 11a and a cover portion 11b which are joined by a hinged section 11c. The cover portion 11b is apertured to receive a mounting structure 10a that extends from one end wall of the monochromator whereto the case 11 is removably secured.

More particularly, the mounting structure 10a is a rectangular mounting bracket that is provided with a pair of slots that are designed to receive the entrance and exit slit defining assemblies for the monochromator. In this connection, the mounting bracket is preferably provided with suitable means (not shown) which maintains a modified exit slit assembly 12 against a locating edge in the slotted portion of the bracket adapted to receive the exit slit assembly. As hereinafter described, the accurate positioning of the modified exit slit assembly 12 within the mounting structure 10a is important to insure that the lens assembly is properly situated in the focal plane of the monochromator.

Referring to FIGURE 2, a mirror 13 which is preferably a half silvered mirror, is pivotally secured to a base or supporting member 14. The base or supporting member is, in turn, mounted within and secured to a lower wall of the light-tight case or housing 11 for the optical device. An adjusting screw 16 extends vertically through the wall of the case 11 and the supporting member 14 so as to bear against a portion of the back surface of the mirror 13 and oppose the action of a spring 16a that is secured to and extends between a rectangular mirror supporting arm 13a and the base member 14. By selectively advancing and retracting the screw 16, the angle at which the mirror is disposed relative to the base member 14 can readily be adjusted. In this connection, the mirror 13 is normally positioned within the case 11 so as to be aligned with the exit slit defined by the assembly 12 but angularly disposed with respect to the plane of the supporting member 14. Because the mirror is half silvered and angularly disposed at an angle of approximately 45° relative to the base member 14, a portion of the total spectral energy supplied by the monochromator is reflected at an angle of approximately 90° toward the photocathodes of a plurality of photomultiplier tubes 17 that are mounted on the base portion 11a of the case 11.

In this connection, each of the photomultipliers 17 is positioned within a suitable tube socket 18. The tube sockets are structurally secured to a supporting wall 19 of the light-tight case 11 and are arranged in wedge shaped array so that all of the photomultiplier photocathodes intercept equal wave length intervals of the dispersed rays of the cylindrical lens. Each of the photomultipliers is spaced a sufficient distance from the photomultipliers situated adjacent thereto so that each intercepts and responds to only a portion of the spectral range that is supplied by the monochromator and dispersed by the exit slit assembly as hereinafter described.

In addition to the photomultiplier tubes 17, an additional photomultiplier 22 is mounted within a socket 23 secured to the lower wall of the case 21 whereto the mirror supporting member 14 is secured. The photomultiplier tube 22 is aligned with the exit slit assembly so that a portion of the total emission line transmitted by the half silvered mirror is sensed and recorded. As a consequence, the total line emission is monitored and yields information which can be utilized to correlate and normalize emission line profiles derived from several cycles of operation. Each of the photomultipliers 17 and 22 is of a conventional side window type so that the light energy striking the sides of the photomultipliers is picked up by the photocathodes thereof thereby resulting in generation of a signal proportional to the incident light energy.

As shown, conductors 26a, which are connected to the appropriate terminals on the tube sockets 18 and 23, extend therefrom and are connected in a conventional manner to the male portions of a plurality of suitable cable connectors 26c mounted in one portion of a side wall 25 of the case 11. The male portions of the connectors, which extend through light-tight apertures formed in the side wall 25, are connected through mating female portions of the connectors to a plurality of signal cables 26b. Each of the signal cables 26b is connected to the input of a suitable measuring and/or recording device (not shown) such as a cathode ray oscilloscope or the like.

The light-tight case 11 which houses the photomultipliers 17 and 22, the electrical components associated therewith, the mirror 13, etc., may be of a conventional design. The case 11 is adapted to be pivotally mounted on a supporting bracket or plate 27 which is secured to and extends along the end wall of the monochromator 10. A pair of conventional snap locks 28 have the individual cooperating portions 28a and 28b thereof secured to the wall portion of the case 11 that extends above the top of the monochromator 10 and to the upper housing wall of the monochromator, respectively. Accordingly, the top of the case can be fixedly secured to the monochromator end wall after being positioned on the supporting bracket 27 by the latching of the cooperating portions of the snap locks 28.

A suitable light-tight seal 29 is provided about the edge of the case that mates with the end wall of the monochromator. This seal 29 precludes light from the surrounding environment from passing into the closed case 11 through an apertured portion 30 that is formed in the cover portion 11b of the case to receive the mounting structure 10a for the entrance and exit slits. More particularly, the cover portion 11b of the case 11 is provided with a rectangular bracket 31 which is secured around the apertured portion 30. The bracket is large enough to insure passage of the mounting structure 10a therethrough and into the case 11. In this connection, when the case 11 is positioned on the supporting bracket 27 the mounting structure 10a and associated entrance and exit slit assemblies pass into the inner portion of the case 21 and are confined therein during operation of the device.

As shown in FIGURE 1, a light-tight entrance tube 32 is secured to the inner surface of the wall 19 of the case 11 so as to encompass an aperture 33 that is provided therein. More particularly, the aperture 33 is defined by a circular bracket 34, which surrounds a suitably proportioned opening in the wall 19. The base of the entrance tube is secured to the inner face of the bracket 34 so as to completely surround the aperture 33. The aperture is designed to supply the necessary communication between a discharge being monitored and the entrance slit of the monochromator when the case is closed.

More particularly, the aperture 33 is designed to be coupled via conventional auxiliary instrumentalities (not shown) to a unit wherein a pulsed discharge is created. As a consequence, the monitored discharge supplies spectral energy that is coupled through the aperture 33 and the entrance tube 32 to the monochromator 10. In this connection, the free end of the entrance tube is brought into alignment with the entrance slit (not shown) of the monochromator when the case is closed as shown in FIG. 1. The spectral energy supplied through the entrance slit is transmitted through and spectrally resolved by the monochromator and a spectral line having a finite width is provided at the exit slit thereof. The locking of the case 11 in a closed condition is effected by a pair of conventional snap locks 35 that are attached to the upper portion of the case adjacent a carrying handle 36.

The exit slit assembly 12 which, as previously described, is positioned within the mounting structure 10a of the monochromator is best seen in FIGURES 3 and 4. Basically, the exit slit assembly is a fixed slit of conventional design formed of a glass rod or any other suitable material that is modified by the addition of a cylindrical lens 37. More particularly, the exit slit assembly 12 includes an upper horizontally extending support plate or bracket 38 which is larger than the slot in the mounting structure 10a so as to engage the upper edge of the mounting structure 10a when positioned therein. A suitable gripping member 39 is secured to and extends upwardly from the supporting plate 38. An apertured backing plate 41 extends downwardly from the supporting plate 38 and serves as the mounting member for the cylindrical lens assembly. In this connection, a lens holder 42 is secured to the face of the backing plate 41 adjacent a horizontal slot 43 which is provided therein. The lens holder 42 includes a pair of vertically extending lens supporting members 44 and 45, each of which has a beveled face 46 that serves to define a converging supporting region and an exit aperture 51 for the rod 37 which extends vertically and forms the cylindrical lens.

As shown in FIGURE 3, a pair of lens supporting elements 48 are secured by means such as cement to the beveled faces 46 of the lens supporting members 44 and 45 and define the entrance aperture 48a of the lens. The cylindrical glass rod is fixedly situated between the corner surface of the lens supporting elements 48 and the forwardmost portions of the beveled faces 46, as viewed in FIGURE 3. This arrangement of supporting elements insures that the glass rod 37 is positively located within the exit slit assembly.

The positioning of the exit slit assembly including the cylindrical glass rod 37 is effected so that the lens defined by the rod lies in the focal plane of the monochromator, which is designated by the letter F in FIGURE 3. Preferably, to achieve optimum dispersion for the arrangement of photomultipliers 17 shown in FIGURE 1, the exit slit assembly 12 is positioned within the mounting structure 10a so that the focal plane defines a cord on the circular cross-section of the rod adjacent the optical aperture defined by the supporting elements 48 as shown in FIGURE 3. In this connection, the rod 37 is positioned so that approximately five-sixths of the diameter thereof extends beyond the focal plane F. Stated alternatively, the focal plane preferably lies rearward of the major axis of the lens a distance equal to approximately two-thirds of the radius of the lens. To further enhance the desired dispersion of the narrow spectral region supplied by the monochromator, the entrance aperture 48a of the lens as defined by the supporting elements 48 is restricted to a width approximately equal to the radius of the rod 37.

To achieve this position of the lens with a standard or commercial monochromator it may be necessary to utilize suitable shims between the backing plate 41 and the lens supporting members 44 and 45 or provide other suitable means for adjusting the position of the lens. When the exit slit assembly 12 is positioned within the slot provided in the mounting structure 10a, the cylindrical lens is generally aligned with a large slot 53 in front supporting plate 52 that is secured to the slotted rectangular mounting bracket.

When positioned in the focal plane of the monochromator, the cylindrical lens formed by the glass rod 37 disperses and substantially broadens an emission line supplied by the monochromator from a pulsed discharge. The dispersed line passes through the aperture 51 and strikes the mirror 13. A portion of the broadened emission line is then reflected by the mirror toward the photocathodes of the photomultipliers 17. In addition, a portion of the total emission line is transmitted by the half silvered mirror 13 and is sensed by the photomultiplier 22.

Since each photomultiplier is suitably spaced from the adjacent photomultipliers, each responds to an equal wave length portion of the dispersed and broadened line. The portions of the broadened line striking the individual photocathodes effects the generation of electrical signals proportional to the intensity thereof. As previously described, these signals are fed via the signal cables 26b to the measuring and/or recording instruments (not shown) utilized in conjunction with the optical device of the present invention.

The signal information derived both from the photomultipliers 17 and the photomultiplier 22 is utilized to provide pertinent and reliable information as to the characteristics of a discharge system being monitored as a result of a single pulsation thereof. In this connection, when a pulsed discharge or a plasma is monitored, the signal information is utilized to yield an indication as to the degree of purity of the plasma, the electron temperature, the ion temperature, and the ion density. Various other characteristics of similar systems can also be determined in reliable fashion and without repeated time consuming measurements through the utilization of the device as previously described.

From the foregoing description, it is apparent that the present invention provides a spectral line splitter which is compact, portable and relatively simple in construction. The utilization of a cylindrical lens having a diameter of 0.5 mm. and positioned as described above in the focal plane of a monochromator having a 250 micron exit slit yields a dispersion of approximately .04 A./mm. using the first order of the grating. The individual photomultipliers 17 are positioned to respond to wave lengths separated by .7 A. thereby allowing a time dependent spectral analysis of emission lines having half widths that vary from 1 A. to 4 A. If desired, larger cylindrical lens can be utilized for broader emission lines and narrower lines can be analyzed by using a higher order of the grating. In addition, various other devices might be utilized in conjunction with the recording instruments so as to obtain any suitable time resolution.

Although the foregoing description has been directed to the utilization of the optical device of the present invention for determining the profile of an optical emission line, it is apparent that the unit could also be employed to yield pertinent information relevant to portions of an absorption spectrum. In this connection, the reduction in intensity of radiation at certain wave lengths or spectral regions resulting from the interposition of absorptive matter between a background of continuous radiation could readily be monitored with the optical device previously described.

Various features of the invention are set forth in the following claims:

What is claimed is:

1. Apparatus for determining the profile of a spectral region which passes through an elongated exit slit assembly of a monochromator comprising a light-tight housing adapted to be secured to the monochromator so as to encompass the exit slit assembly and having an aperture in one wall thereof at a location which allows optical communication with the exit slit assembly when the housing is secured to the monochromator, a cylindrical lens having its axis extending in the direction of the elongation of the slit secured to the exit slit assembly, so that the focal plane of the monochromator passes through said lens whereby the spectral region which passes through the exit slit of the monochromator is substantially dispersed, and a plurality of light-sensitive devices mounted in a generally wedge-shaped array within said housing, the positions of said lens and said array being such that said array of light-sensitive devices span the dispersed spectral region with each of said light-sensitive devices intercepting a generally different but equal wave length portion of said region whereby the profile of the dispersed spectral region can be determined.

2. Apparatus as set forth in claim 1 which additionally includes a further light-sensitive device mounted within said housing for monitoring the intensity of the entire spectral region passing through the exit slit of the monochromator.

3. Apparatus as set forth in claim 2 which includes means mounted within said housing and in alignment with said lens for effecting the reflection of a portion of the entire spectral region passing through said exit slit, and said array of light-sensitive devices being positioned to intercept said reflected portion of the spectral region.

4. Apparatus as set forth in claim 3 wherein the cylindrical lens is positioned so that the focal plane lies rearward of the axis of the lens a distance equal to approximately two-thirds of the radius of the lens and the entrance aperture thereof is restricted to a width approximately equal to the radius of the lens.

References Cited

UNITED STATES PATENTS

| | | | |
|---|---|---|---|
| 1,202,223 | 10/1916 | Redfield | 88—14 |
| 2,446,874 | 8/1948 | Geffner et al. | 250—226 |
| 2,696,750 | 12/1954 | Hunter | 250—226 |
| 2,748,074 | 5/1956 | Davis et al. | 88—57 |
| 2,858,452 | 10/1958 | Wouters | 250—207 |
| 3,046,399 | 7/1962 | Ladell | 250—51.5 |
| 3,062,964 | 11/1962 | Lubin | 88—57 |

(Other references on following page)

FOREIGN PATENTS 1,288,234  2/1962  France.

OTHER REFERENCES

Saunderson et al., "A Photoelectric Instrument for Direct Spectrochemical Analysis," Journal of the Optical Society of America, vol. 35, No. 11, November 1945, pp. 681–697.

Bolas et al., The Lens, Bolas & Brown, published by Dawbarn & Ward, Ltd. London, 1902, pp. 9–11 relied upon.

JEWELL H. PEDERSEN, *Primary Examiner.*

A. R. BORCHELT, *Examiner.*

R. L. WIBERT, E. S. STRICKLAND,

*Assistant Examiners.*